United States Patent
Farooq et al.

(10) Patent No.: US 9,205,794 B1
(45) Date of Patent: Dec. 8, 2015

(54) VARIABLE-STIFFNESS ENERGY ABSORBER FOR MOTOR VEHICLE

(71) Applicant: Ford Global Technologies, LLC, Dearborn, MI (US)

(72) Inventors: Iskander Farooq, Novi, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/600,074

(22) Filed: Jan. 20, 2015

(51) Int. Cl.
*G06F 19/00* (2011.01)
*B60Q 1/00* (2006.01)
*B60R 21/0134* (2006.01)
*B60R 21/34* (2011.01)
(Continued)

(52) U.S. Cl.
CPC ........... *B60R 21/0134* (2013.01); *B60R 19/205* (2013.01); *B60R 21/013* (2013.01); *B60R 21/017* (2013.01); *B60R 21/34* (2013.01); *B60R 2019/186* (2013.01)

(58) Field of Classification Search
CPC ..................... B60R 19/483; B60R 2021/0004; B60R 21/0136; B60R 21/34; G01M 17/00; B60K 28/10; B60D 1/28; G06F 11/30
USPC ............ 701/30.8, 30.5, 36, 46, 301; 180/274; 340/436, 903, 3.41; 296/35.2, 187.03, 296/187.04, 187.09; 293/107, 108, 109, 293/138, 141–144; 280/500–505
See application file for complete search history.

(56) References Cited

U.S. PATENT DOCUMENTS 4,968,878 A * 11/1990 Pong .................... A47L 11/4011
                                                                                            15/319
5,682,168 A * 10/1997 James .................. H01Q 1/3291
                                                                                          343/711

(Continued)

FOREIGN PATENT DOCUMENTS

CN        102837655     * 12/2012
CN        102837655 A    12/2012
(Continued)

OTHER PUBLICATIONS

A Smith, et al., Pedestrian protection potential of an adaptive bumper, Cellbond Composites Ltd., Huntingdon UK.

*Primary Examiner* — Muhammad Shafi
(74) *Attorney, Agent, or Firm* — Jason Rogers; Brooks Kushman P.C.

(57) ABSTRACT

A vehicle bumper energy absorber system includes a foam energy absorber (EA) for transverse mounting forward of a bumper and having a plurality of cavities formed therein. Variable-stiffness elements are located within the cavities and embedded within the EA. The variable-stiffness elements are formed from open-cell foam treated with magneto-rheological fluid. Electromagnetic devices are co-located with the respective elements and are energized to create magnetic fields acting on the magneto-rheological the elements and thereby increase the stiffness of the elements. When energized, the elements increase the overall stiffness of the EA/element system. When the electromagnetic devices are not energized, the stiffness of the EA by itself is relatively low to meet pedestrian protection goals. At speeds where pedestrian protection is not required but low-speed damageability goals are important, the electromagnetic devices are energized to stiffen the EA/element system.

16 Claims, 3 Drawing Sheets

(51) Int. Cl.
   *B60R 21/013*   (2006.01)
   *B60R 21/017*   (2006.01)
   *B60R 19/20*    (2006.01)
   *B60R 19/18*        (2006.01)

(56) References Cited

U.S. PATENT DOCUMENTS

| | | | |
|---|---|---|---|
| 6,388,043 B1 | 5/2002 | Langer et al. | |
| 6,437,688 B1* | 8/2002 | Kobayashi | G08G 1/166 |
| | | | 180/167 |
| 7,029,044 B2 | 4/2006 | Browne et al. | |
| 9,139,200 B2* | 9/2015 | Hammadou | B60W 30/08 |
| 2002/0184236 A1* | 12/2002 | Donath | B60R 1/00 |
| 2004/0117086 A1 | 6/2004 | Rao et al. | |
| 2005/0021195 A1* | 1/2005 | Zeitler | G05D 1/024 |
| | | | 701/23 |
| 2005/0149251 A1* | 7/2005 | Donath | G01C 21/26 |
| | | | 701/532 |
| 2012/0078499 A1* | 3/2012 | Park | B60R 21/34 |
| | | | 701/301 |

FOREIGN PATENT DOCUMENTS

| | | |
|---|---|---|
| CN | 103562011 A | 2/2014 |
| DE | 102006026447 A1 | 12/2007 |
| DE | 102012013327 A1 | 1/2014 |
| WO | 0221013 A1 | 3/2002 |
| WO | 02090105 A1 | 11/2002 |
| WO | 2008044059 A2 | 4/2008 |

* cited by examiner

VARIABLE-STIFFNESS ENERGY ABSORBER FOR MOTOR VEHICLE

TECHNICAL FIELD

This disclosure relates to an impact energy absorbing system for a motor vehicle, and to such a system which includes a constant-stiffness energy absorber having variable-stiffness elements embedded therein. The variable-stiffness elements comprise blocks of open-cell foam treated with magneto-rheological material, and electromagnetic devices are co-located with the foam blocks to generate magnetic fields thereby increasing the stiffness of the blocks when desired.

BACKGROUND

A typical bumper system for a motor vehicle (passenger car, light truck, sport-utility vehicle, cross-over utility vehicle, etc.) generally comprises a bumper (also commonly referred to as a bumper beam) extending transversely relative to the vehicle and one or more energy absorbing components mounted forward of the bumper. The bumper is typically formed of metal and/or other high-strength material and the energy absorber (EA) is typically made of a foam material and is engineered to deform in order to absorb the kinetic energy of a relatively low-speed impact. A plastic fascia (and/or other trim components) may cover the bumper system to achieve a desired appearance and aerodynamics.

For most passenger vehicles, the EA should be designed to have sufficient stiffness to meet regulatory requirements and/or other targets related to minimizing damage to the vehicle resulting from a low-speed impact. Design constraints (vehicle styling, aerodynamics, etc.) may require that the EA be relatively thin (as measured along the longitudinal axis of the vehicle) and therefore the EA must be made of a relatively stiff material to achieve a sufficient level of resistance to impact damage.

Bumper systems for some vehicles are also designed to meet pedestrian protection requirements/goals related to avoiding/minimizing injuries to a pedestrian when struck by a moving vehicle. A common criterion for pedestrian protection is lower leg injury, and one way to minimize such injury is to reduce the stiffness of the EA so that the portion of the bumper system striking the lower leg is "softer." Balancing low-speed damageability and pedestrian protection goals may present challenges for the vehicle designer.

It is known to employ magneto-rheological (MR) devices to vary or adjust the stiffness of a vehicle structural component in response to a predicted or actual collision. See, for example, U.S. Patent Application No. 2004/0117086A1. MR devices employ MR fluid which has a shear strength that is negligibly low until it is subjected to a magnetic field, whereupon the shear strength increases by an amount depending on the strength of the magnetic field. Accordingly, controllable electromagnetic devices may be used to apply a magnetic field when desired to achieve a required level of stiffness in the MR device.

SUMMARY

According to a disclosed embodiment, apparatus for a vehicle comprises an energy absorber for transverse mounting forward of a vehicle front bumper, a plurality of elements embedded within the energy absorber and comprising open-cell foam treated with magneto-rheological material, and an electromagnetic device energizable to generate a magnetic field acting on the elements thereby increasing a stiffness of the elements to a level greater than a stiffness of the energy absorber.

The apparatus may further comprise a control module operative to direct energization of the electromagnetic device based upon a speed of the vehicle. The controller may, for example, direct a relatively higher energization when the vehicle speed is below a threshold value and direct a relatively lower energization when the vehicle speed is above the threshold value. The speed thresholds may be related to objectives such as low-speed damageability and/or pedestrian protection.

In a further embodiment, a variable-stiffness energy absorber system for a vehicle comprises an energy absorber having a first stiffness, and a plurality of elements embedded within the energy absorber and spaced from one another, the elements comprising open-cell foam treated with magneto-rheological material. The system further comprises a plurality of electromagnetic devices co-located with the respective elements and electrifiable to generate magnetic fields acting on the magneto-rheological material to give the elements a second stiffness greater than the first stiffness. An electronic control module is operative to direct electrification of the plurality of electromagnetic devices.

The energy absorber and the elements may provide a first overall stiffness when the electromagnetic devices are not energized that is appropriate for pedestrian injury reduction. The energy absorber and the elements may provide a second overall stiffness when the electromagnetic devices are energized appropriate for reduction of damage to the vehicle during a low-speed collision. The controller may control energization/electrification of the plurality of electromagnetic devices based upon vehicle speed.

The controller may determine the vehicle speed based on data from a vehicle communications bus.

At least one of the elements may have a volume fraction of MR material to foam in an approximate range of from 10% to 20%.

In a further embodiment, a vehicle bumper energy absorber system comprises a foam block for transverse mounting forward of a bumper and having a first stiffness and having a plurality of cavities formed therein; a plurality of elements located within respective cavities of the block, the elements comprising open-cell foam treated with magneto-rheological material; and a plurality of electromagnetic devices co-located with the respective elements to generate, when energized, magnetic fields acting on the magneto-rheological material of the elements.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
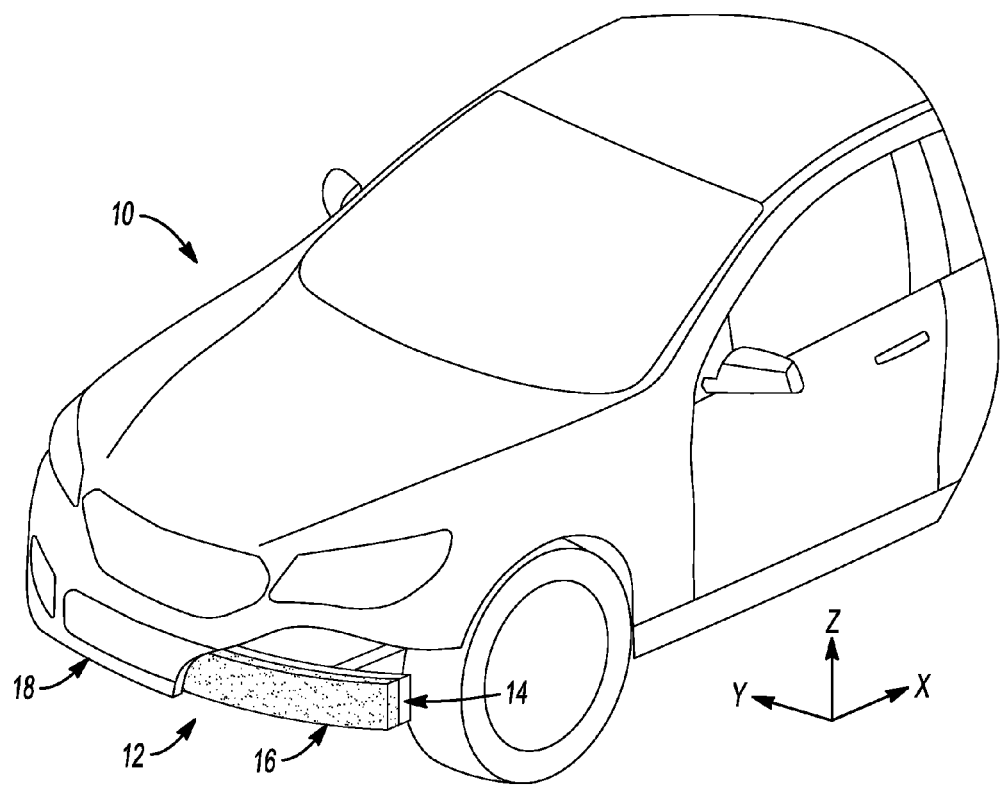
FIG. 1 is a perspective schematic view of a motor vehicle having a bumper system of the general type disclosed herein.

As seen in FIG. 1, a motor vehicle 10 includes a bumper assembly 12 comprising a bumper 14 arranged generally transverse to the vehicle (along the y-axis indicated in FIG. 1) and an energy absorber (EA) 16 positioned forward of the bumper 14.

As is well known in the art, a fascia 18 may be arranged in front of the bumper assembly 12 to achieve a desired appearance and/or aerodynamics of the front of the vehicle. Bumper 14 is typically made of a high-strength material such as steel or aluminum, as is well known in the art.

EA 16 is preferably formed of an open-cell foam material having relatively low stiffness. The term "relatively low stiffness" as used herein refers to a level of stiffness low enough such that, when the EA 16 is operatively installed in the vehicle, the resulting structure yields sufficiently to meet desired pedestrian protection goals. EA 16 is depicted as being a single part but it may alternatively be fabricated in multiple parts that span the width of bumper 14 when installed in the vehicle.

Figure 2:
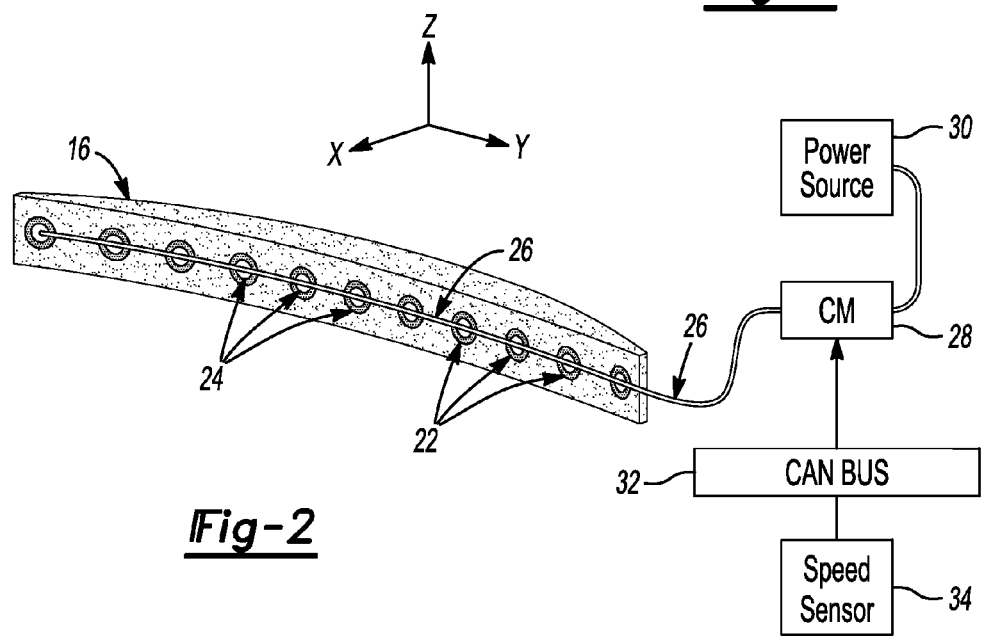
FIG. 2 is a schematic depiction of an energy absorber system having variable stiffness elements embedded therein.
Figure 3:
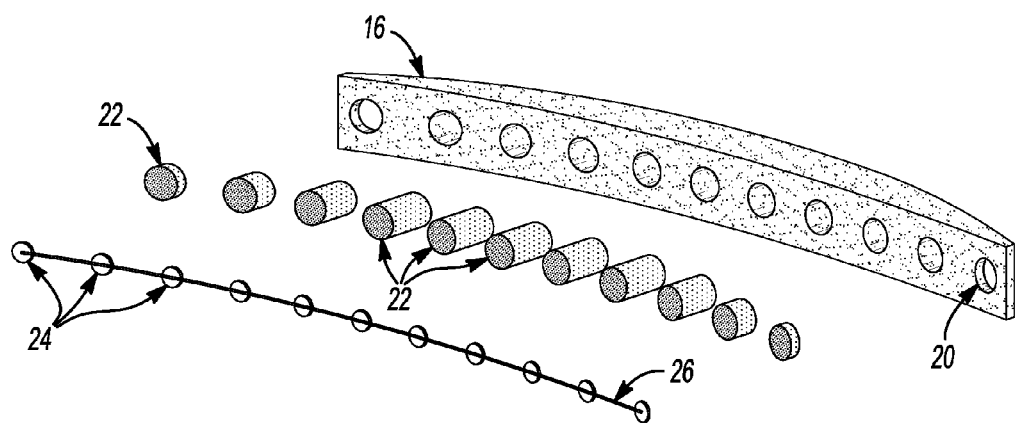
FIG. 3 is an exploded view of the energy absorber of FIG. 2.

Referring now to FIGS. 2 and 3, EA 16 has a plurality of holes or cavities 20 formed therein to receive respective variable-stiffness elements 22. Elements 22 are inserted into holes 20 so that they are embedded in EA 16 and are spaced from one another laterally across the width (vehicle y-axis) of EA 16.

Variable-stiffness elements 22 are formed of an open-cell foam material (such as may be made from polyurethane or other polymers) that has been treated with a magneto-rheological (MR) fluid. It has been found that open-cell foam treated with a relatively small quantity of MR fluid will exhibit a significant increase in stiffness when subjected to a magnetic field. The MR fluid needs only to coat the interior surfaces of the foam's cell structure (the pores), which requires a quantity of fluid much less than the amount necessary to saturate or fill the pores of the foam.

Figure 5:
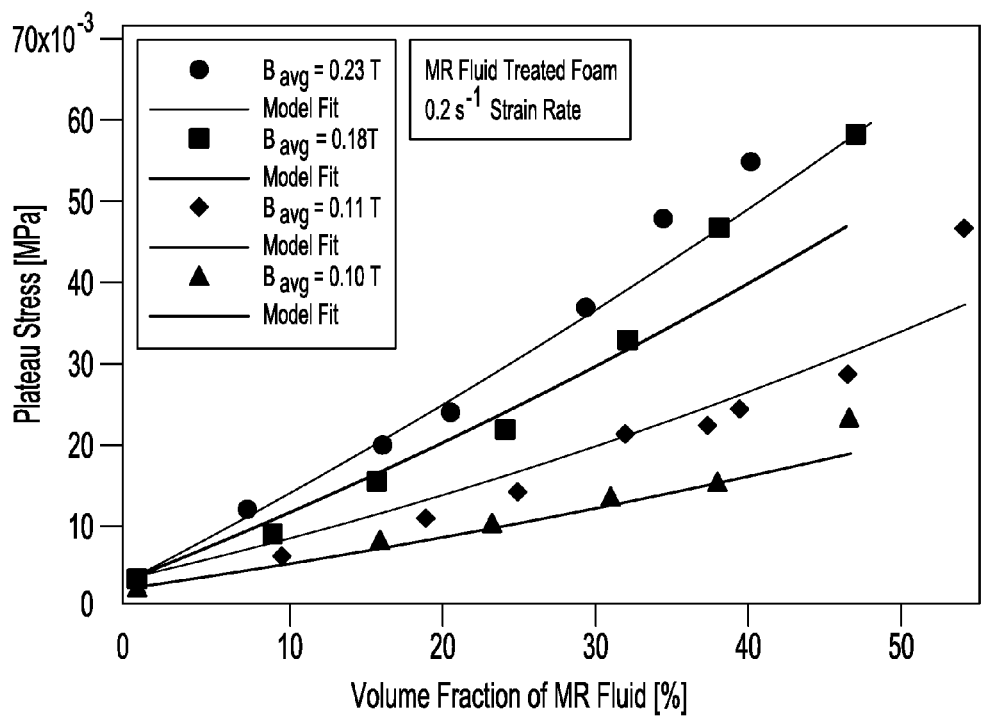
FIG. 5 is a graph of experimental test results of foam elements treated with varying amounts of MR fluid and at different magnetic field strengths.

The amount of MR fluid used to treat the elements 22 may be expressed as a volume fraction (percentage) of MR fluid to foam. It has been found that foam elements having a MR fluid volume fraction in a range of approximately 10% to 20% fluid exhibit significant increases in stiffness when exposed to a magnetic field. The graph of FIG. 5 shows experimental test results of foam elements having varying volume fractions of MR fluid to foam when exposed to a magnetic field of four different intensities (expressed in units of teslas, T). Lower volume fractions of MR fluid correlate with reduced cost of the elements 22.

Electromagnetic (EM) devices 24 are co-located with respective elements 22. Electrically conductive wires 26 are connected with the EM devices 24 to supply them with electric power. FIGS. 2 and 3 show the EM devices 24 connected in electrical series, however this is only for simplicity of depiction, as other electrical arrangements may be advantageous.

Figure 4:
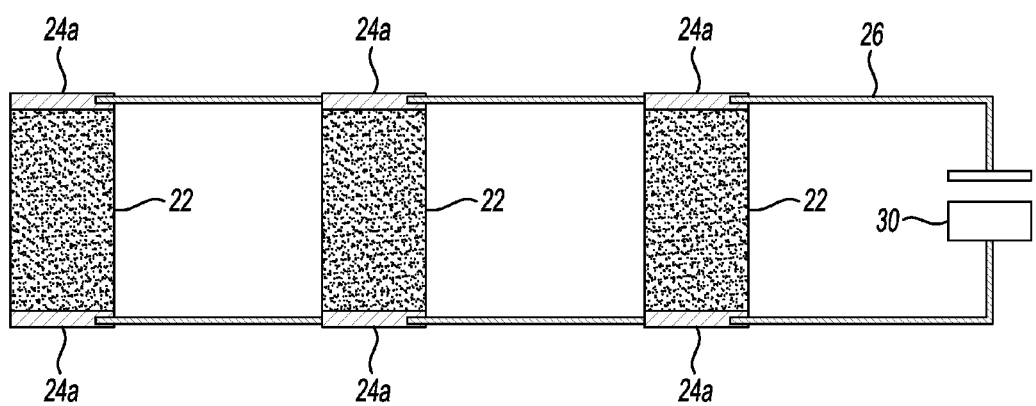
FIG. 4 is a schematic depiction of a series of electromagnetic devices.

EM devices 24 may comprise any apparatus that generates an electromagnetic field when supplied with electrical power. For example, an EM device may take the form of an electric coil and associated component (such as a plate or core) made of a ferrous material to generate a magnetic field when the coil is energized, as is well known in the art. In another embodiment shown if FIG. 4, each EM device comprises a pair of plates 24a made from ferrous material located on opposing sides of the respective foam element 22.

EM devices 24 are designed and positioned (relative to the elements 22) to generate magnetic fields that will encompass the elements 22 with a minimum usage of electric power. While the present figures depict one EM device 24 co-located with each element 22, it may be advantageous to use a single EM device positioned so as to affect more than one element.

Wires 26 are connected with an electronic control module (CM) 28 and a power source 30 which may, for example, be the battery and/or generator/alternator of the vehicle. CM 28 is electronically connected with a high-speed data bus of the vehicle, such as CAN bus 32 (of the general type well-known in the automotive art), as indicated in FIG. 2. CM 28 obtains a vehicle speed signal from a speed sensor 34 via CAN bus 32 and implements pre-programmed logic to determine the level or amount of electrical power supplied to the EM devices 24.

In vehicle speed ranges where low-speed damageability requirements/goals apply (typically less than 10 kph) CM 28 supplies a level of electric power to EM devices 24 sufficient to generate magnetic fields affecting the MR fluid of the elements 22 and thereby increase the stiffness of the elements. The stiffness of the elements 22 when subjected to the magnetic fields is greater than the stiffness of the EA 16. The elements 22 are of sufficient size and spaced from one another so that, when energized, they supplement the relatively low stiffness of the EA 16 and the overall stiffness of the combined EA/element system is increased to a level sufficient to meet the low-speed damageability requirements/goals. "Overall stiffness" refers here to the effective stiffness of the EA 16 in combination with the variable-stiffness elements 22 (and any other components, such as fascia 18) when the EA/element combination strikes another object.

In vehicle speed ranges where pedestrian lower leg injury reduction requirements or goals apply (the European New Car Assessment Program (Euro NCAP) currently tests at 40 kph), electric power to the element 22 is reduced or shut off completely, thereby resulting in lower stiffness of the elements 22 and lower overall stiffness of the EA/element system. By adjusting the level of electrical power supplied to the elements 22, a desired level of overall EA/element stiffness may be achieved in order to reach a desired balance between requirements of damageability and pedestrian protection. The specific requirements/goals that apply to a particular vehicle and in a particular geographic location may be used to determine the logic applied by CM 28 to determine a level of electric power at a given speed speeds.

Figure 6:
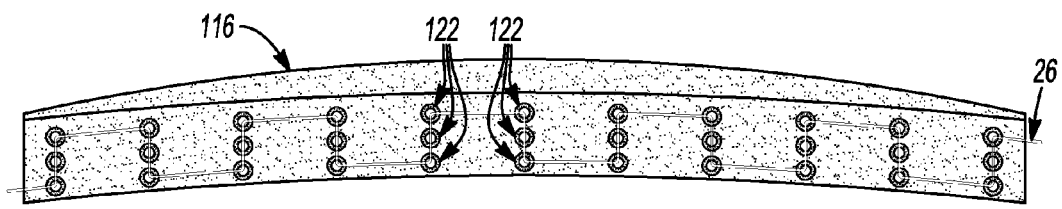
FIG. 6 is a schematic depiction of a second embodiment of an energy absorber with embedded variable-stiffness elements.

Various permutations of the size, number, and arrangement of variable-stiffness elements may be used to achieve a desired overall stiffness of the energy absorber at a minimum cost of the components and minimum amount of electric power required. For example, FIG. 6 shows an embodiment in which (as compared with FIGS. 2 and 3) a larger number of smaller elements 122 are embedded in an EA 116. The performance of different variable-stiffness element arrangements (the number, size, pattern, and spacing between the adjacent elements) can be determined by computer-aided analysis, physical tests and/or other known types of analysis.

The provision of a plurality of variable-stiffness elements embedded within and spread across an energy absorber having a level of stiffness appropriate for pedestrian protection allows the overall stiffness of the EA to be increased to a level appropriate for low-speed damageability goals when required. Compared with a design in which the entire energy absorber is treated with MR liquid, the present invention accomplishes these objectives at a reduced cost in terms of both the amount of MR fluid required and the amount of electrical power required to achieve the desired stiffness levels. Also, the disclosed variable-stiffness element having a low volume fraction of MR fluid results in lower cost as compared with a foam element that is saturated with MR fluid.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for a vehicle comprising:
an energy absorber for mounting forward of a bumper;
a plurality of elements embedded within the energy absorber and comprising open-cell foam treated with magneto-rheological material;
an electromagnetic device energizable to generate a magnetic field affecting the elements thereby increasing a stiffness of the elements to a level greater than a stiffness of the energy absorber; and a control module directing energization of the electromagnetic device based upon vehicle speed.

2. The apparatus of claim 1 wherein the controller directs a relatively higher energization when the vehicle speed is below a threshold value and directs a relatively lower energization when the vehicle speed is above the threshold value.

3. The apparatus of claim 1 wherein the controller determines the vehicle speed based on data from a vehicle communications bus.

4. The apparatus of claim 1 wherein the electromagnetic device comprises a pair of ferrous metal plates on opposing sides of at least one of the elements.

5. The apparatus of claim 1 wherein at least one of the elements has a volume fraction of magneto-rheological material to foam in an approximate range of from 10% to 20%.

6. The apparatus of claim 1 wherein the electromagnetic device comprises a plurality of devices co-located with the respective elements.

7. A variable-stiffness energy absorber system for a vehicle comprising:
an energy absorber having a first stiffness;
a plurality of elements embedded within the energy absorber and spaced from one another, the elements comprising open-cell foam treated with magneto-rheological material;
a plurality of electromagnetic devices co-located with the respective elements and electrifiable to generate magnetic fields affecting the magneto-rheological material to give the elements a second stiffness greater than the first stiffness; and
a controller operative to direct electrification of the plurality of electromagnetic devices based upon vehicle speed, the energy absorber and elements combining to provide a first overall stiffness when the electromagnetic devices are not electrified that is appropriate for pedestrian injury reduction, and the energy absorber and the elements combining to provide a second overall stiffness when the electromagnetic devices are electrified that is appropriate for reduction of damage to the vehicle during a low speed collision.

8. The energy absorber system of claim 7 wherein the controller directs a relatively higher energization when the vehicle speed is below a threshold value and directs a relatively lower energization when the vehicle speed is above the threshold value.

9. The energy absorber system of claim 8 wherein the controller determines the vehicle speed based on data from a vehicle communications bus.

10. The energy absorber system of claim 7 wherein at least one of the electromagnetic devices comprises a pair of ferrous metal plates on opposing sides of at least one of the elements.

11. The energy absorber system of claim 7 wherein at least one of the elements has a volume fraction of magneto-rheological material to foam in an approximate range of from 10% to 20%.

12. A vehicle bumper energy absorber system comprising:
a foam block for transverse mounting forward of a bumper and having a first stiffness and having a plurality of cavities formed therein;
a plurality of elements located within respective cavities of the block, the elements comprising open-cell foam treated with magneto-rheological material;
a plurality of electromagnetic devices co-located with the respective elements to generate, when energized, magnetic fields affecting the magneto-rheological material of the elements and a control module operative to direct energization of the electromagnetic device based upon a vehicle speed, the foam block and the elements combining to provide a first overall stiffness when the electromagnetic devices are not energized that is appropriate for pedestrian injury reduction, and the foam block and the elements combining to provide a second overall stiffness when the electromagnetic devices are energized that is appropriate for reduction of damage to the vehicle during a low-speed collision.

13. The energy absorber system of claim 12 wherein the controller directs a relatively higher energization when the vehicle speed is below a threshold value and directs a relatively lower energization when the vehicle speed is above the threshold value.

14. The energy absorber system of claim 12 wherein the controller determines the vehicle speed based on data from a vehicle communications bus.

15. The energy absorber system of claim 12 wherein at least one of the electromagnetic devices comprises a pair of ferrous metal plates on opposing sides of at least one of the elements.

16. The energy absorber system of claim 12 wherein at least one of the elements has a volume fraction of magneto-rheological material to foam in an approximate range of from 10% to 20%.

* * * * *